UNITED STATES PATENT OFFICE 2,407,218

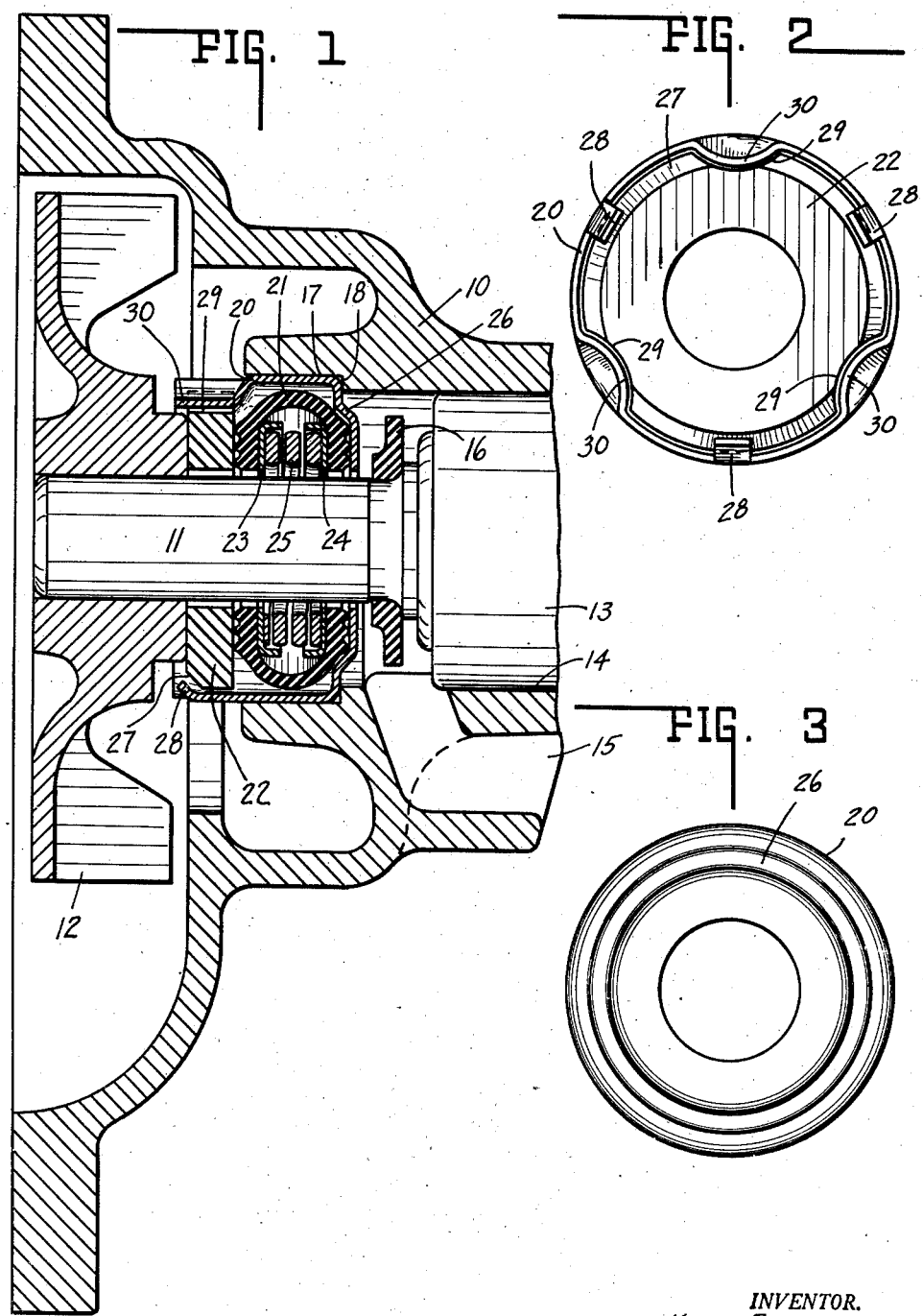

FLUID SEALING DEVICE

Kurt A. Beier, Indianapolis, Ind., assignor to Schwitzer-Cummins Company, Indianapolis, Ind., a corporation Application February 9, 1945, Serial No. 577,040

1 Claim. (Cl. 286—11)

This invention relates to improvements in fluid sealing devices particularly adapted for use in connection with water pumps, compressors, or similar apparatus having a shaft rotatably supported in a bearing housing. As applied to the shaft of a water pump, it is adapted to prevent fluid leakage to and about the shaft and its bearings.

This is of the general character of the fluid seal disclosed in my Letters Patent No. 2,250,348 granted July 22, 1941, and involves the use of an inwardly flanged flexible sealing sleeve for permitting longitudinal movement of the associated sealing members as well as the rotating shaft and associated parts, and maintaining them free of contact with the fluid, the seal being normally out of contact with the shaft.

It is the object of this invention to provide a complete seal of unit construction or capsule form to include the sealing washer, while permitting of longitudinal flexibility to take up and compensate for wear or misalignment. Whereas the seal of the above patent includes a self-contained unit embodying the flexible sleeve, spring and retainers, the sealing washer was separate therefrom and required assembly therewith. This invention contemplates the employment of the complete sealing device in a capsule or unit construction including the sealing washer all assembled, centered and contained by a seal retaining cup for convenient installation in any construction which may be either a stationary housing or a rotor.

This construction and arrangement of the parts in a retaining cup to provide a complete unit, not only makes possible a greatly simplified method of machining the stationary housing or the rotor for insertion of the complete unit, but also overcomes the difficulty of assembling the parts of the seal to properly center them relative to each other and the shaft about which they are mounted. Thus expensive turning and milling operations in a stationary housing or a rotary member are eliminated and any contact between the elements of the seal and the rotating shaft is prevented.

Another feature of the invention resides in the interlocking and driving relation between the parts, whereby relative rotation between the flexible sealing sleeve and the sealing washer is prevented. Whereas it has been the practice to provide the sealing washer with radially extended square lugs slidably mounted in square keyways provided in the housing or rotor in which the seal is mounted, this invention involves a substantial improvement thereon. The sharp edged tongue and slot interlocking of the sealing washer, generally formed of a carbon composition, develops a corrosive action such as to wear and eat away the tongues or lugs of the washer, permitting of too much play and chatter and eventually destroying them. To overcome this condition the usual radially extending lugs of the sealing washer are eliminated and the interlocking to prevent relative rotation is accomplished by forming about the periphery of the sealing washer one or more inwardly extending arcuate recesses into which inwardly depressed arcuate interlocking lugs conforming thereto are provided about the adjacent portion of the retaining cup.

Another feature of the invention resides in providing the retaining cup with an annular centering shoulder to receive and position the flexible sealing sleeve therein and retain it centered and spaced from the shaft over which the seal is mounted. This centering shoulder on the cup prevents the sealing sleeve from becoming displaced or slipping down into contact with the shaft.

The full nature of the invention will be understood from the accompanying drawing and the following description and claim:

Fig. 1 is a central vertical section through a housing, rotor and sealing device therefor with the rotor shaft in elevation.

Fig. 2 is a front elevation of a sealing device viewed from the sealing washer side thereof.

Fig. 3 is a rear elevation of the sealing device viewed from the rear or cup side thereof.

In the drawing there is shown a seal embodying this invention mounted, for purposes of illustration, in a water pump housing 10 to surround and seal a shaft 11 for driving an impeller or rotor 12. The shaft extends from an enlarged bearing portion 13 rotatably mounted in the bearing portion 14 of the housing in which a drain port 15 is provided to drain away any leakage thrown from the flinger disc 16 mounted on the shaft adjacent the bearing portion and rotating therewith.

The housing 10 is provided with a cylindrical seat 17 formed with a shoulder 18 for receiving the sealing device. The sealing device is slipped or press fitted into the seat 17 in fixed and sealing relation with respect to the housing. Wherein the seal is herein shown as mounted in the stationary housing of a structure such as a water pump, compressor or the like, the arrangement may be reversed wherein the seal is similarly fitted into a seat formed in the rotor or hub portion of an impeller or the like.

The sealing device of the invention comprises an annular retaining sealing cup 20, having an open face and a partially closed face. The open face referred to as the front of the seal is adapted to receive the flexible sealing sleeve or rubber seal member 21 and the sealing washer 22. The sealing sleeve is U-shaped in cross section, having inwardly extending flange portions, one bearing in sealing relation against the inner wall of the retaining cup back portion and the opposed flange having sealing engagement with the sealing washer 22. The intermediate outer portion of the sealing sleeve between the two opposed flanges extends outwardly for flexing to permit its flanged portions to move toward and from each other, such as to compensate for wear or misalignment of the relative rotating parts in which it is installed.

Embraced within the flexible sealing sleeve between its opposed flanges there are a pair of spring retainers 23 and 24. A pressure member or coil spring 25 is mounted within the sleeve between the retainers for exerting axial pressure upon the flanges of the sleeve to yieldingly maintain them in sealing engagement with the retaining cup and sealing washer respectively.

The back wall of the retaining cup is dished to provide an annular centering shoulder 26 conforming in diameter to the adjacent inwardly extending flange of the sleeve. This dished portion of the cup is formed to receive and conform to the sealing sleeve so that said sleeve will be restrained within the confines of the centering shoulder to retain it in proper centering and spaced relation with respect to the shaft 11.

The sealing washer 22 is bevelled about its outer edge as indicated at 27, and the edge of the retaining cup about its open face is formed with a pair of spaced inwardly struck retaining tongues 28 overlapping said bevelled edge of the washer. Thus as the seal assembly and washer are mounted within the cup, the tongues 28 are struck inwardly to retain the entire seal assembly within the cup as a unit.

To prevent relative rotation between the cup and sealing washer, and through the cup, between the sealing sleeve and washer, said washer is formed with one or more inwardly and arcuately formed recesses or pockets 29, there being illustrated herein three of such recesses equally spaced about the periphery of the washer. The retaining cup is formed with similarly positioned conforming inwardly curved arcuate interlocking lugs 30. Said lugs 30 are formed to extend only partially inwardly from the front open faced edge of the cup to an extent slightly greater than the thickness of the washer. Thus the lugs 30 interlock with their respective recesses 29 to prevent relative movement between the washer and the retaining cup. By reason of the arcuate contour of the interlocking lugs and recesses, a substantial bearing surface is provided and sharp cutting edges avoided. Also the cutting or abrasive action of the sealing washer is minimized or eliminated by reason of the lugs being formed on the cup rather than on the washer as heretofore.

From the above it will be observed that a complete self-contained capsule-like seal is provided, such as may be readily installed or removed for replacement, with all parts in proper assembled and centered relation including the sealing washer or carbon disc; and wherein the carbon disc is restrained against relative movement with respect to the flexible seal by a tongue and slot arrangement wherein the interlocking tongue or lug is of arcuate form on the retaining cup rather than protruding outwardly from the sealing washer.

The invention claimed is:

In a fluid seal, a self-contained unit comprising a flexible rubber sleeve of an annular formation adapted to surround a shaft in spaced relation thereto and having an intermediate bulged portion to permit axial expansion and contraction, spaced resilient integral flanges on said sleeve to form spaced end walls therefor, an expanding spring within said sleeve and acting between said flanges for flexing said flanges about their connections with said sleeve, a rigid sealing washer formed with a plurality of arcuate recesses in the periphery thereof, a seal retaining cup embracing said sleeve and washer, a plurality of inwardly bent tongues formed about said cup inwardly of the periphery of said washer for retaining it with said sleeve in unitary sealing relation against the tension of said spring, inwardly extending arcuate lugs formed from the periphery of said cup conforming to and seatable in said arcuate recesses respectively for interlocking engagement therewith to prevent relative rotation therebetween, and an annular centering shoulder formed in the opposite end portion of said retaining cup to provide an annular seating and centering shoulder for said sleeve.

KURT A. BEIER.